United States Patent
Mittelstadt et al.

(10) Patent No.: US 6,519,482 B1
(45) Date of Patent: Feb. 11, 2003

(54) MOBILE TELEPHONE HELP INFORMATION

(75) Inventors: David J. Mittelstadt, Boulder, CO (US); Shawn C. Morrison, Boulder, CO (US); Gayathri Chittiappa, Boulder, CO (US); Jon D. Slater, Boulder, CO (US); Steve C. DeTar, Longmont, CO (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/392,854

(22) Filed: Sep. 9, 1999

(51) Int. Cl.[7] ................................................. H04B 1/38
(52) U.S. Cl. ........................ 455/566; 455/561; 455/557
(58) Field of Search ................................. 455/557, 566, 455/561

(56) References Cited

U.S. PATENT DOCUMENTS

| | | | | |
|---|---|---|---|---|
| 5,247,700 A | * | 9/1993 | Wohl et al. ................. | 455/552 |
| 5,815,142 A | * | 9/1998 | Allard et al. ................ | 345/173 |
| 5,852,783 A | * | 12/1998 | Tabe et al. .................. | 455/550 |
| 5,915,217 A | * | 6/1999 | Wiedeman et al. ......... | 455/427 |
| 5,920,826 A | * | 7/1999 | Metso et al. ................ | 455/557 |

OTHER PUBLICATIONS

Manufactor Pamphlet 1993 US Bell South–Simon.*
Nokia, Nokia 6160 Owner's Manual, Nokia Mobile Phones, Inc. (Canada).

* cited by examiner

Primary Examiner—Thanh Cong Le
Assistant Examiner—Alan T. Gantt
(74) Attorney, Agent, or Firm—Philip R. Wadsworth; Gregory D. Ogrod

(57) ABSTRACT

A mobile telephone displays user information on a display. The mobile telephone displays an information icon on the display if help information is available that is related to the user information on the display. The mobile telephone generates a control signal if an information key on the mobile telephone is activated. The mobile telephone displays the help information on the display in response to the generation of the control signal when the information icon is displayed.

16 Claims, 4 Drawing Sheets

FIG. 1 - PRIOR ART

| USER INFO. 211 | HELP INFO. 211 |
|---|---|
| A | X |
| B | Y |
| C | Ø |
| D | Z |

FIG. 4

MOBILE TELEPHONE HELP INFORMATION

BACKGROUND OF THE INVENTION

I. Field of the Invention

The present invention relates to the field of mobile telephones. More particularly, the present invention relates to a novel and improved mobile telephone that displays an information icon and provides help information when the icon is activated.

II. Description of the Related Art

FIG. 1 illustrates the configuration and operation of a mobile telephone in the prior art. FIG. 1 is a block diagram that depicts a conventional mobile telephone 100. The mobile telephone 100 includes display 101, dialing buttons 102, menu scroll control 103, menu select control 104, and control circuitry 105. The control circuitry 105 includes user information 111. Those skilled in the art will appreciate that FIG. 1 is simplified for clarity, and some conventional components are omitted. Those skilled in the art will also understand that FIG. 1 is a logical view of the control circuitry 105. The control circuitry 105 is implemented using processors, memory, software, control lines, and other conventional circuitry.

The control circuitry 105 controls the display 101 to display the user information 111 and icons 113. The control circuitry 105 operates in response to control signals from dialing buttons 102, the menu scroll control 103, and the menu select control 104. The user information 111 could be any operational information and typically includes menus and menu selections. The user is able to navigate through menus to control the configuration and operation of the mobile telephone 100. The mobile telephone 100 displays the icons 113 to indicate conditions, such as a new page or a new voice message. The user then operates the mobile telephone in a conventional fashion to access the page or voice mail. Unfortunately, there is not an effective technique for using icons to quickly display help information to the user.

SUMMARY OF THE INVENTION

The present invention includes a novel and improved mobile telephone that effectively provides help information that is a relevant to the user information on the display. Advantageously, the user conveniently obtains relevant help information by pressing an information key in response to an information icon.

The mobile telephone displays user information on a display. The mobile telephone displays an information icon on the display if help information is available that is related to the user information o n the display. The mobile telephone generates a control signal if an information key on the mobile telephone is activated. The mobile telephone displays the help information on the display in response to the generation of the control signal when the information icon is displayed.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 4 is a table diagram of a control circuitry logic in an example of the invention.

DETAILED DESCRIPTION OF THE PREFERRED EMBODIMENTS

Figure 1:
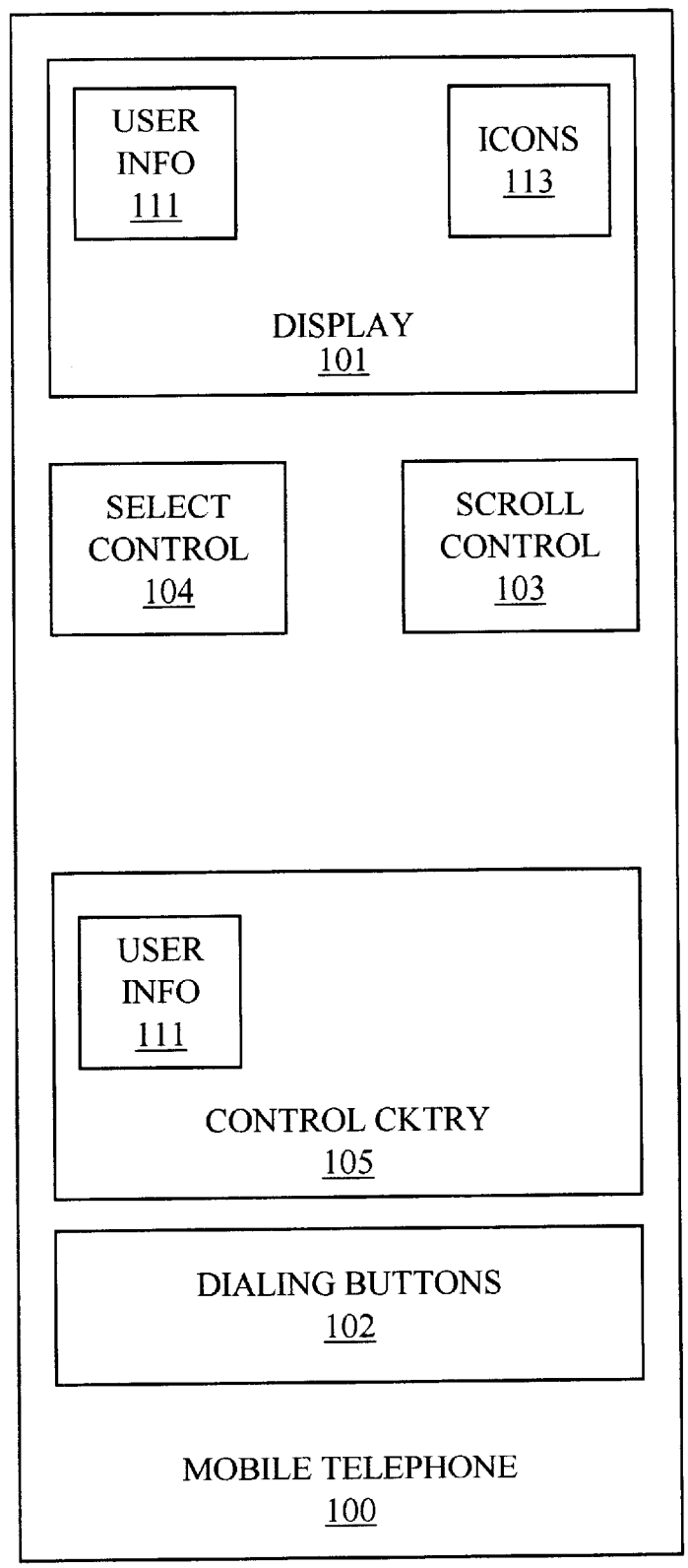
FIG. 1 is a block diagram of a mobile telephone in the prior art.
Figure 2:
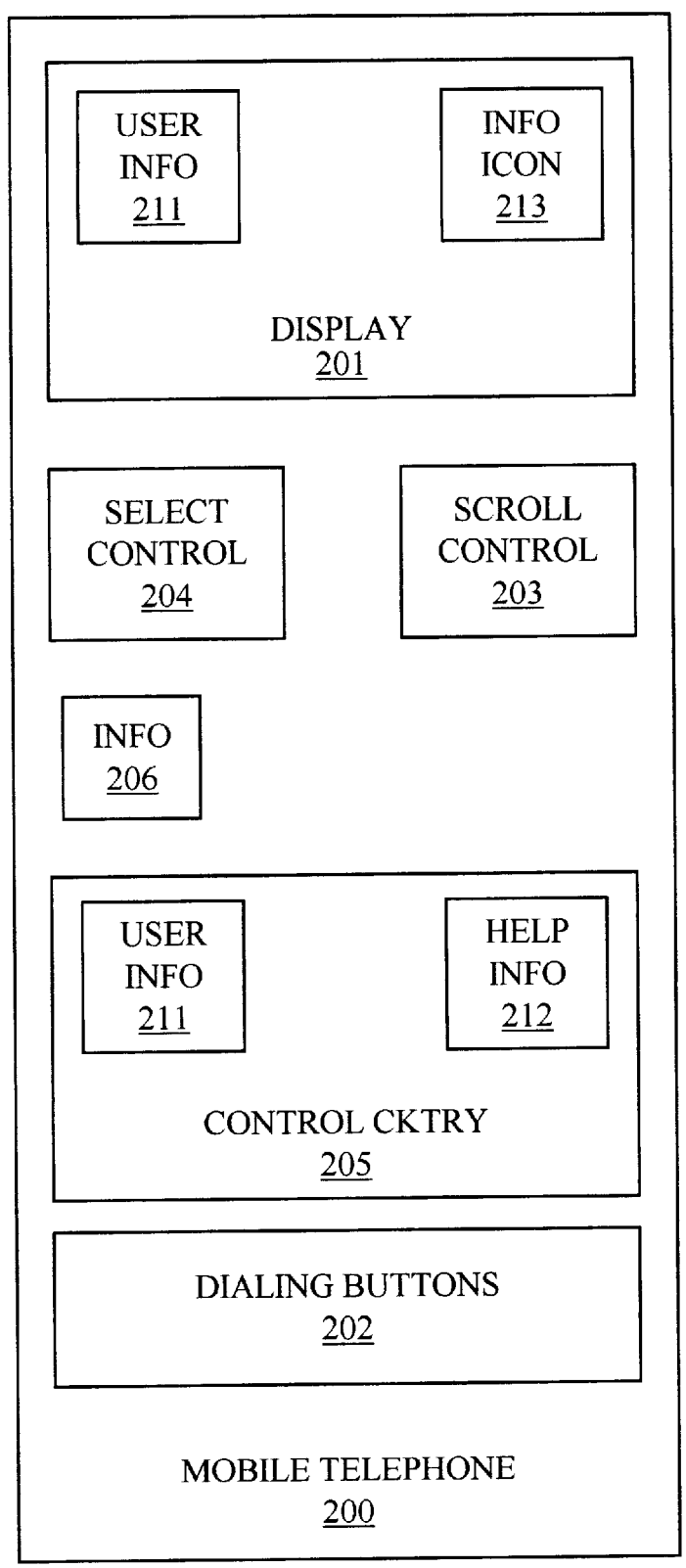
FIG. 2 is a block diagram of a mobile telephone in an example of the invention.
Figure 3:
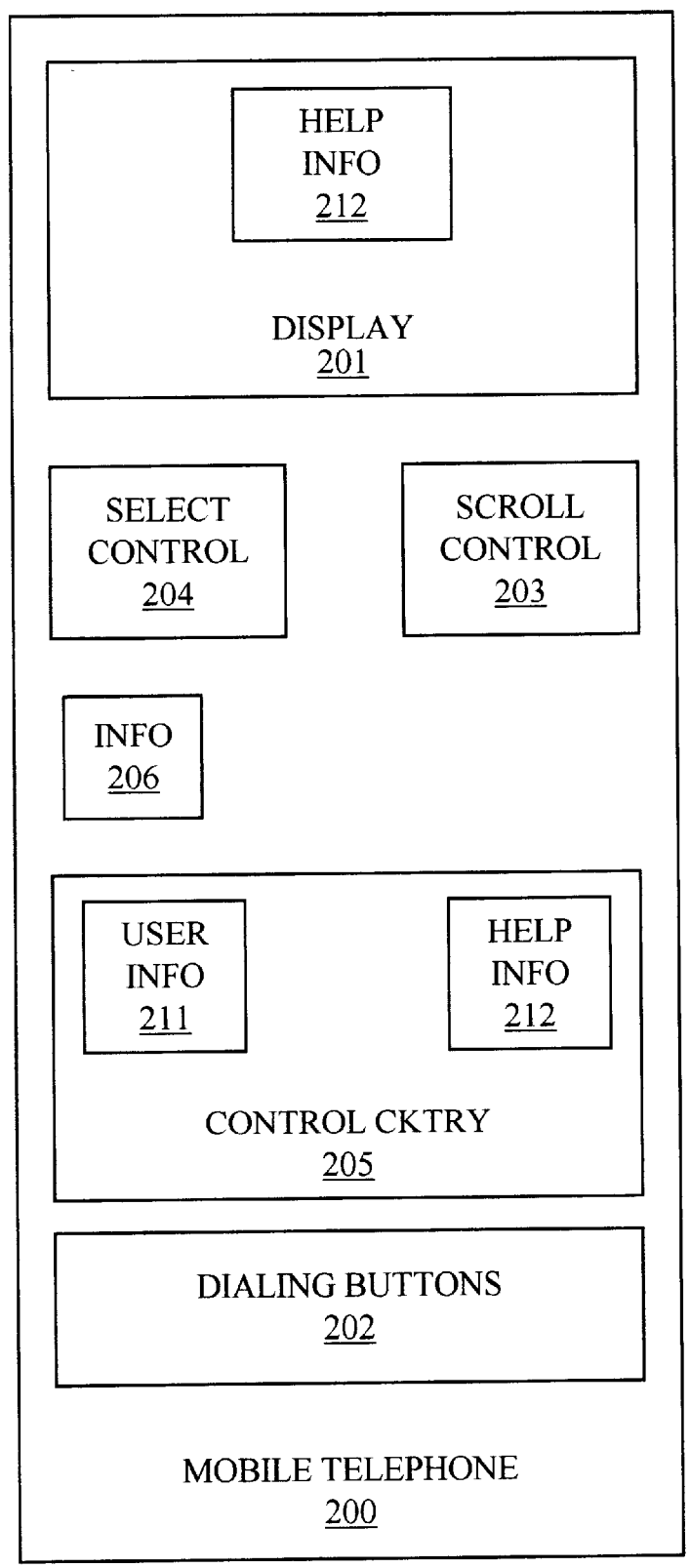
FIG. 3 is a block diagram of a mobile telephone in an example of the invention.
Figure 4:
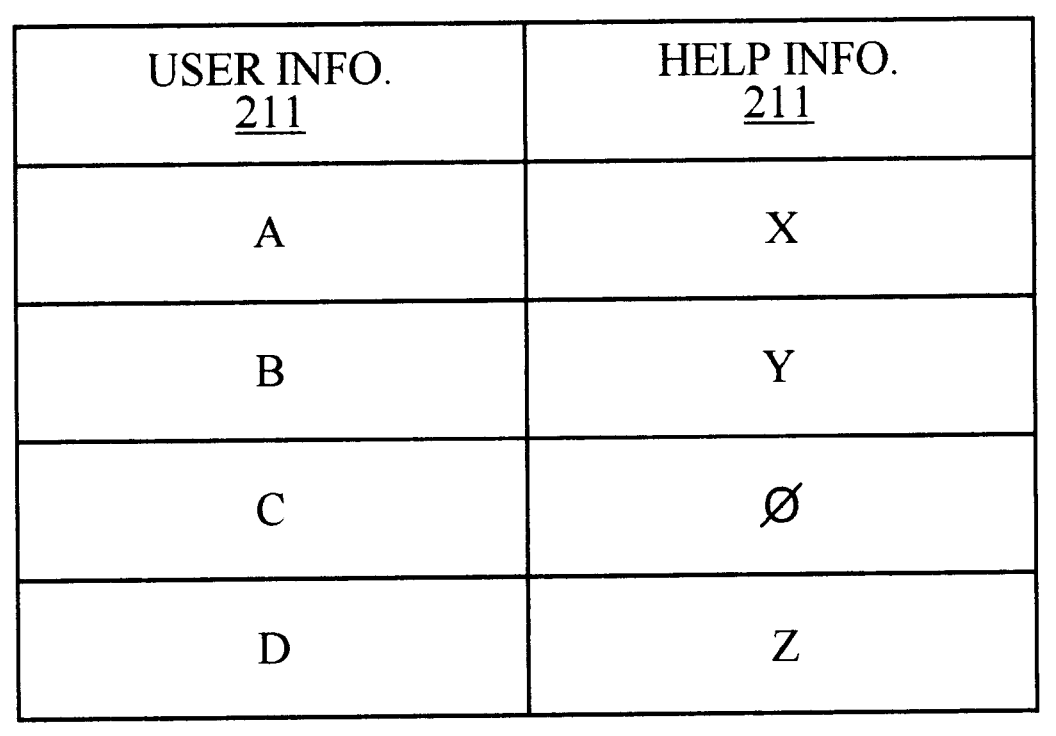

FIGS. 2–4 illustrate the configuration and operation of a mobile telephone in an example of the invention. FIG. 2 is a block diagram that depicts a mobile telephone 200. The mobile telephone 200 includes display 201, dialing buttons 202, menu scroll control 203, menu select control 204, control circuitry 205, and information key 206. The control circuitry 205 includes user information 211 and help information 212. Those skilled in the art will appreciate that FIG. 2 is simplified for clarity, and some conventional components are omitted. Those skilled in the art will also understand that FIG. 2 is a logical view of the control circuitry 205. The control circuitry 205 is implemented using processors, memory, software, control lines, and other conventional circuitry.

The control circuitry 205 controls the display 201 to display the user information 211 in response to control signals from dialing buttons 202, the menu scroll control 203, and the menu select control 204. The user information 211 could be any operational information and typically includes menus and menu selections. The user is able to navigate through menus to control the configuration and operation of the mobile telephone 200.

The control circuitry 205 also controls the display 201 to display an information icon 213 if help information 212 is available that is related to the user information 211 on the display 201. An example of the information icon 213 is the letter "i". The information key 206 generates a control signal when activated. In this example, the information key 206 is labeled with "Info". The control circuitry 205 controls the display 201 to display the help information 212 in response to the generation of the control signal when the information icon 213 is displayed.

In some embodiments, the control circuitry 205 starts a timer when the help information is displayed. If the timer times-out before another command is entered, the control circuitry 205 reverts the display back to the user information 211 where the help information was entered. Another command could be a scroll command, a key, or a set of keys to display other user information 211 or revert back to the user information 211 where the help information was entered. In other embodiments, the help information could be several display screens in length. In these cases, the control circuitry 205 could control the display to automatically scroll through the display screens unless a manual scroll command is entered. If the end of the display screens is reached and no user commands are received, the control circuitry 205 reverts the display back to the user information 211 where the help information was entered. User commands could be the manual scroll command, a key, or a set of keys to display other user information 211 or revert back to the user information 211 where the help information was entered. FIG. 3 depicts the mobile telephone 200 displaying the help information 212 after activation of the information key 206.

FIG. 4 is a table diagram of control circuitry 205 logic in an example of the invention. The table has user information 211 in the left column and corresponding help information 212 in the right column. The user information 211 is broken down into specific groups A, B, C, and D. Where available, the help information 212 is also broken down into specific groups X, Y, Z that correspond to the specific groups of the user information 211. Each specific group of help information 212 explains the corresponding group of user information 211.

If the group of user information that is on the display 201 has corresponding help information, then the information icon 213 is displayed. For example, if the user information "B" is displayed, then the information icon 213 is also displayed to indicate that the help information "Y" is available. If the information key 206 is activated, then the help information "Y" is displayed. If the user information "C" is on the display 201, then the information icon 213 is not displayed since there is no corresponding help information available.

In some embodiments of the invention, the control circuitry 205 also controls the display 201 to display the information icon 213 if a status update is available. The control circuitry 205 then controls the display 201 to display the status update in response to generation of the control signal by the information key 206 when the information icon 213 is displayed. The status update could be a service authorization or the service provider currently providing service to mobile telephone 200.

In some embodiments of the invention, the mobile telephone of the present invention is configured to communicate with satellites systems and in other embodiments the mobile telephone of the present invention is configured to communicate with terrestrial systems.

Some satellite systems use code division multiple access (CDMA) spread spectrum signals as disclosed in U.S. Pat. No. 4,901,307, issued Feb. 13, 1990, entitled "Spread Spectrum Multiple Access Communication System Using Satellite or Terrestrial Repeaters," and U.S. Pat. No. 5,691,974, issued Nov. 25, 1997, entitled "Method and Apparatus for Using Full Spectrum Transmitted Power in a Spread Spectrum Communication System for Tracking Individual Recipient phase Time and Energy," both of which are assigned to the assignee of the present invention, and are incorporated herein by reference.

Related commonly owned applications also incorporated herein by reference are application Ser. No. 08/723,722, entitled "Position Determination Using One Low-Earth Orbit Satellite," application Ser. No. 08/723,722, entitled "Passive Position Determination Using Two Low-Earth Orbit Satellite," application Ser. No. 08/723,725, entitled "Unambiguous Position Determination Using Two Low-Earth Orbit Satellites," and application Ser. No. 08/723,723 entitled "Ambiguity Resolution for Ambiguous Position Solutions Using Satellite Beams."

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for operating a mobile telephone, the method comprising:
   displaying user information on a mobile telephone display;
   displaying an information icon on the mobile telephone display if help information is available that is related to the user information on the display;
   generating a control signal if an information key on the mobile telephone is activated; and
   displaying the help information on the mobile telephone display in response to a generation of the control signal when the information icon is displayed.

2. The method of claim 1 further comprising:
   displaying the information icon on the mobile telephone display if a status update is available; and
   displaying the status update on the mobile telephone display in response to the generation of the control signal when the information icon is displayed.

3. The method of claim 2 wherein displaying the status update comprises displaying a service authorization.

4. The method of claim 2 wherein displaying the status update comprises displaying a current service provider.

5. The method of claim 1 wherein displaying the information icon comprises displaying an "i".

6. The method of claim 1 wherein the information key is labeled with "Info".

7. The method of claim 1 wherein the mobile telephone is configured to communicate with satellites.

8. The method of claim 7 wherein the mobile telephone is configured to communicate using code division multiple access spread spectrum signaling.

9. A mobile telephone comprising:
   a display;
   an information key configured to generate a control signal when activated; and
   control circuitry configured to control the display to display user information, to control the display to display an information icon if help information is available that is related to the user information on the display, and to control the display to display the help information in response to a generation of the control signal when the information icon is displayed.

10. The mobile telephone of claim 9 wherein the control circuitry is configured to control the display to display the information icon if a status update is available, and to control the display to display the status update in response to generation of the control signal when the information icon is displayed.

11. The mobile telephone of claim 9 wherein the status update comprises a service authorization.

12. The mobile telephone of claim 9 wherein the status update comprises a current service provider.

13. The mobile telephone of claim 9 wherein the information icon comprises an "i".

14. The mobile telephone of claim 9 wherein the information key is labeled with "INFO".

15. The mobile telephone of claim 9 wherein the mobile telephone is configured to communicate with satellites.

16. The mobile telephone of claim 15 wherein the mobile telephone is configured to communicate using code division multiple access spread spectrum signaling.

* * * * *